UNITED STATES PATENT OFFICE.

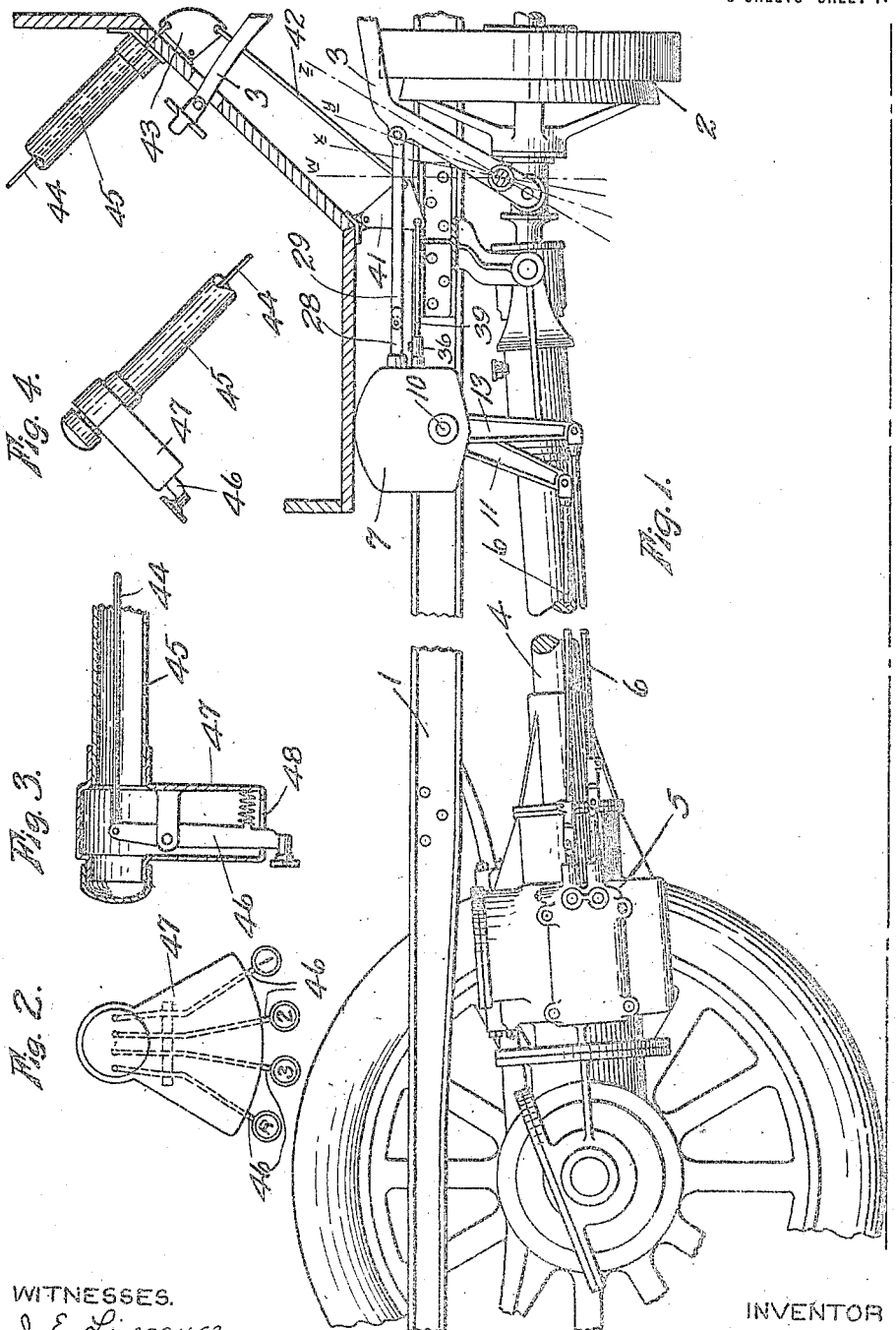

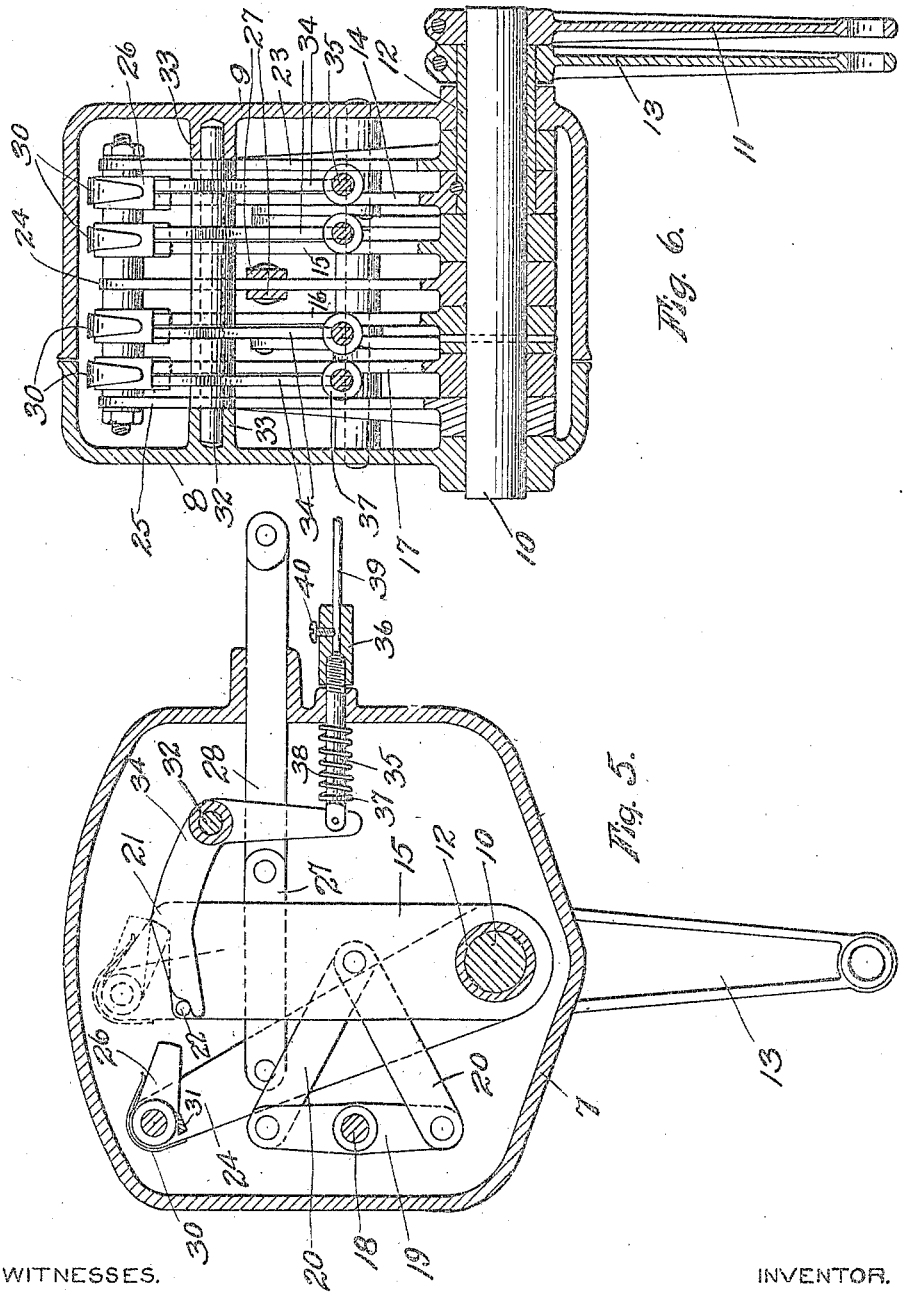

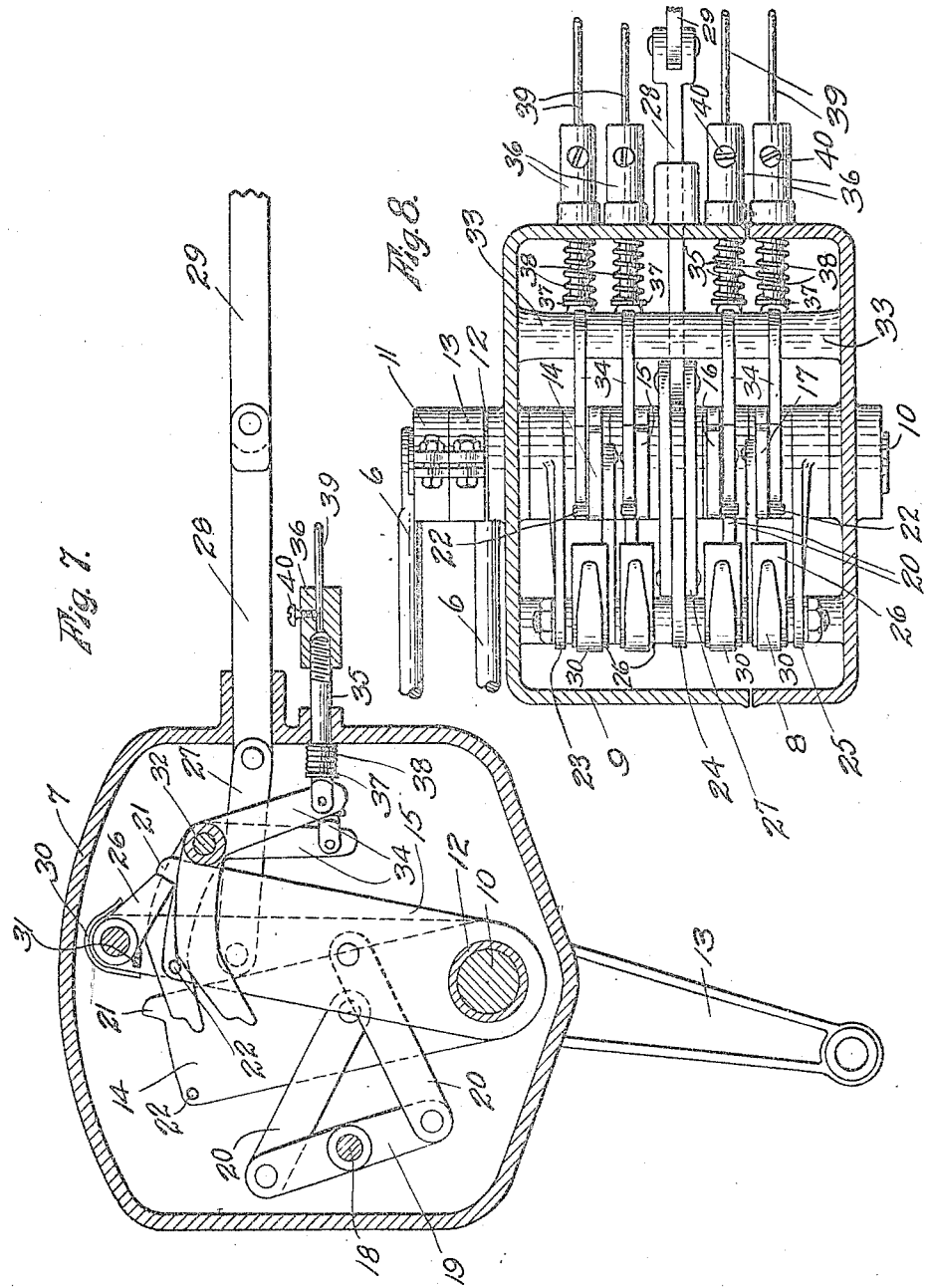

BAYARD E. RICHARDSON, OF GRAND RAPIDS, MICHIGAN, ASSIGNOR TO MECHANO GEAR SHIFT CO., OF GRAND RAPIDS, MICHIGAN, A CORPORATION OF MICHIGAN.

GEAR-SHIFTING MECHANISM.

1,253,887.

Specification of Letters Patent.

Patented Jan. 15, 1918.

Application filed January 8, 1915. Serial No. 1,122.

*To all whom it may concern:*

Be it known that I, BAYARD E. RICHARDSON, a citizen of the United States, and a resident of the city of Grand Rapids, in the county of Kent and State of Michigan, have invented a certain new, useful, and Improved Gear-Shifting Mechanism, of which the following is a specification, which, in connection with the accompanying drawings, makes full disclosure of the construction and operation of an embodiment of the invention that others skilled in the art may understand the same.

This invention is a development of and improvement in my previous construction for which application for Letters Patent were filed Jan. 13, 1913, having Serial Number 741,828. The present construction has the same general aims and purposes as this former construction, attaining them in a much more simple and less costly manner and with means consisting of comparatively few parts, easily and cheaply manufactured and assembled. The invention consists essentially in a gear shifting mechanism operable by the clutch pedal of an automobile and adapted to shift the gears in a sliding gear transmission gearing, and a selective mechanism located in position for ready access for operation by the hand, the selection of a gear to be shifted into transmitting position being made by hand and the actual shifting of the gear to transmitting position following on operation of the clutch pedal, after the clutch has been disengaged and any gear that may be in transmitting position returned to neutral. This mechanism by which the selection is done also is so related and connected to the shifting mechanism, that when a gear is carried into transmitting position, the selecting mechanism serves to indicate the fact and always indicates it as long as the gear is in transmitting position. This is a different structure from my previous device in which the said indicating took place when a gear was transferred to transmitting position, but the indicating feature became ineffective as soon as the selective mechanism was operated for another shift of gearing it then indicating what gear was to be transferred and not what gear was in transmitting position. These various features, together with novel arrangement of parts and elements to form a particularly efficient and durable device at very little cost is fully shown in the embodiment disclosed in the drawings in which, Figure 1 is a side elevation showing the operative relation of the invention with an automobile.

Fig. 2 is a plan view of the selective and indicating mechanism shown as viewed from above the steering post.

Fig. 3 is a sectional view taken centrally of the steering post and the housing for the selective means near the top thereof.

Fig. 4 is a side view of the upper part of the steering post of the automobile.

Fig. 5 is a sectional view taken through the casing inclosing the shifting mechanism and showing the parts thereof in neutral.

Fig. 6 is a partial sectional and front elevation of the said shifting mechanism.

Fig. 7 is a view similar to Fig. 5 but showing the shifting mechanism in positions occupied after being acted upon to shift a gear into transmitting position.

Fig. 8 is a plan view of the shifting mechanism, the top of the casing inclosing it being removed the outlines of the casing being shown in section.

Similar reference numerals refer to similar parts throughout the several views of the drawing.

This invention is of especial application to automobiles. In the illustration of my invention shown, the automobile is of usual construction, having frame members 1, clutch 2 a clutch pedal 3 for operation of the clutch in ordinary manner for disconnecting the power from the driven parts, a drive shaft 4 leading to the transmission gearing inclosed in the casing or housing 5, and which is of the usual sliding gear type, the operation of the gears in their shifting being performed immediately by longitudinal movements of the rods 6 leading into the casing and operatively associated with the sliding gears in the well known manner. All of these parts are well known and necessary elements of any automobile having a sliding gear transmission and their construction and relation to each other are well known to those skilled in the automobile art, such that further specific description is not thought necessary.

Located forward of the gear casing 5 and to one side of the drive shaft 4 is a housing 7 which contains the immediate selecting mechanism for selecting and operating a desired gear shift and operatively associated with the clutch pedal of the automobile that it may be actuated by movement thereof after desired selection is made. The housing is comprised of separate parts 8 and 9 which may be secured together in any desired fashion and which when so secured form a hollow housing inclosed on all sides. A short distance above the base thereof a shaft 10 is journaled and it carries at one end the depending arm 11, the lower end of which has pivotal connection with one of the shifting rods 6. A sleeve 12 is passed over this shaft for part of its length and terminates short of the end thereof and a second depending arm 13 is fixedly secured to the sleeve, the other slidable shifting rod 6 being pivotally attached thereto at its lower end. Turning of the shaft will, it is evident, give arm 11 angular movement either forward of or to the rear of its central neutral position, and of the sleeve to the arm 13, thereby serving to give longitudinal movements in either direction to the rods 6 connected therewith.

A plurality of members which I will denote by the term "gear shifting arms," and by reference numerals 14, 15, 16 and 17 are mounted for oscillating movements in the housing to move back and forth therein from their central upright positions. Arm 14 is pierced at its lower end and is formed with a journal passing over sleeve 12 and is firmly secured to the sleeve. Arm 15 is similarly formed at its lower end and passes over the shaft 10 fitting loosely thereon. Arms 16 and 17 are formed substantially identical with arm 15 and are likewise mounted on the shaft 11, the arm 16 being pinned thereto to move therewith and the arm 17 loosely mounted on the shaft. Near the rear wall of the housing and located a distance above the base is a rod 18 supported by and between the sides of the housing and on said rod a pair of links or levers 19 are pivotally mounted spaced apart and from the sides of the housing by sleeves, carried by the rod 18. The levers 19 are centrally mounted on the rod 18 and extend equally distant up and down from the rod, and at the upper and lower ends thereof have connected pivotally thereto links 20 which extend forward and are secured pivotally at their front ends to the arms 14, 15, 16, and 17. The links 20 which are attached to arms 14 and 15 are secured at their rear ends to the same lever 19, while the links attached to arms 16 and 17 are likewise secured at their rear ends to the other lever 19. It will be clear from this construction that when either arm 14 or 15 is oscillated, its companion arm will be oscillated in the opposite direction and an equal amount as, when arm 14 or 15 is drawn forward, its attached link 20 is carried with it turning lever 19 about its pivot and drawing the other link 20 attached to the other companion arm to the rear and the arm following. Accordingly whichever of the arms 14 or 15 is receiver of the force tending to oscillate it, the sleeve 12 will be turned and the arm 13 turned with it tending to operate the rod 6 secured thereto, though the direction of turning imparted to sleeve 12 will not be the same with the forward movements of both arms 14 or 15. For instance, forward oscillatory movement of arm 14 will turn sleeve 12 in the same direction and operate arm 13 to the rear, while forward oscillatory movement of arm 15 will turn sleeve 12 in the opposite direction and operate arm 13 forwardly. The same is true with respect to arms 16 and 17 and shaft 10, and a forward oscillation of either arm will serve to move the arm 11 attached to shaft 10 in a manner similar to the movements of arm 13 by arms 14 and 15.

The upper edges of each of the arms 14, 15, 16 and 17 are formed in the arc of a circle the center of which is coincident with the axis of shaft 10 for the greater portion of the width of the arms, said arms near their forward edges being each provided with upward projections 21 as shown. Each arm near the rear upper corner thereof is also provided with a pin fixed thereto and projecting laterally therefrom a short distance as shown at 22.

Three arms 23, 24 and 25 are mounted for pivotal movement within the housing 7, the axis about which they move being the axis of shaft 10. Arm 23 is received over the sleeve 12 between arm 14 and the side of the housing, and arms 24 and 25 are received over shaft 10, the first being located between arms 15 and 16, and the latter between the arm 17 and the opposite side of the casing or housing. These arms extend nearly to the top of the housing 7 and are joined together by a bolt which is used as a pivot shaft for the four dogs 26 positioned so as to ride one over each of the arms 14 to 17 inclusive, and properly spaced from each other and the ends of arms 23, 24 and 25 by sleeves as indicated. Pivotally secured to the central arm 24 are a pair of links 27 which at their front ends are pivoted to the rear end of link 28 extending through the front side of member 9 of the housing and which at its forward end is pivotally attached to still another link 29, it at its forward end being pivotally attached to the clutch pedal 3 so that on forward movement of the clutch pedal the arms 23, 24 and 25 and the dogs 26 will be carried forward with it as will be evident. Each of the dogs 26 is actuated by a spring 30 tending to depress the forward ends of the dogs and retain them in depressed position the depression of said dogs being stopped in any convenient manner as by stop bars 31 located between the arms 23, 24 and 25 so that the forward ends of the dogs will always, when drawn forward, ride immediately above the upper rear edges of the arms 14 to 17 inclusive. Any other convenient positioning means for the dogs 26 may be used as well.

Positioned a distance forward of the front edges of arms 14 to 17 is a horizontal rod 32 supported by and between the side members of the housing 7 by means of lugs 33 cast integral therewith and on said rod are pivotally mounted four bell-crank levers 34, one for each arm 14, 15, 16, and 17, the rearwardly extending arms of said bell-crank levers lying adjacent the sides of the said arms, and the rear ends of the bell-crank levers having engagement with the laterally extending pins 22, said levers being cut away to form a seat for the pins. On movement of the arms 14 to 17 away from central position, the pins 22 move also and away from the levers 34. With the levers in normal position, however, the pins striking against the ends of the levers stop the said arms 14 to 17 in central neutral position and prevent forward movement away from such positions. It will be noted that the uppermost points of the levers 34 when they stand in normal position lie in the same plane with the uppermost points of the projections 21 of the arms 14 to 17, and that each lever 34 inclines downwardly and rearwardly from such uppermost points until the ends of the levers are located below the upper curved edges of arms 14 to 17 back of the projections 21. The dogs 26 are slightly wider than the combined thicknesses of an arm 14 and a lever 34 and as they are drawn forward by operation of the clutch pedal said dogs will ride upon the inclined upper edges of the levers 34 and the forward ends of the dogs will be elevated above the projections 21 and have no engagement therewith. This is the action if all of the arms 14 to 17 are in central position and all of the bell-crank levers 34 lie in normal position as shown in Fig. 5.

To each of the downwardly projecting arms of the levers 34, a rod 35 is pivotally attached and these rods extend forward through the front side of the housing 7, each being threaded at its forward end and receiving thereon the nut 36. A collar 37 is fastened to each rod 35 near its point of attachment to its lever 34 and a coiled spring 38 is positioned over each rod 35 lying between the collar and the front side of the housing. These springs being under compression tend to elevate the rearwardly extending arms of the levers 34, and nuts 36 are of utility in adjusting the levers 34 so that they will elevate when at their extreme upper position with their uppermost points in the same plane with the uppermost points of the projections 21 as heretofore noted.

Each nut 36 is formed with a small longitudinal opening leading from the front face thereof interiorly and adapted to receive the rear end of a wire 39 which is secured within the nut by the set screw 40 as shown. There are four of these wires and they extend forward and have attachment at their forward ends to the series of bell-crank levers 41 pivotally mounted on a support attached to the foot board of the front compartment of the automobile. Other wires 42 lead from the levers 41 to a second series of bell-crank levers 43 pivotally mounted on a support secured to the inclined foot board of the automobile in the immediate vicinity of the foot of the steering post. From each of the levers 43 a wire 44 extends into the steering post 45 the full length thereof having attachment at the upper end to one of the levers 46, mounted pivotally in the housing 47 secured at the top of the steering post. The forward ends of the four levers 46 extend backwardly through slots 48 in the housing and at their ends outside of the housing are each provided with a button for ready operation by the finger. Each button carries an indicating character to denote the speed which it is designed to select when operated, the characters used, 1, 2, 3 and R denoting, respectively the first, second and third forward speeds, and the one reverse speed, the usual arrangement in sliding gear transmissions.

From this description of the construction the operation will be easily understood. Suppose the gears of the transmission to all be in neutral position. In such case, all of the arms 14 to 17 will be in upright position as shown in Fig. 5. If, now, a desired shift is to be made, the button corresponding is depressed, this serving to draw its associated wire 39 forward and turning the associated lever 34 on its pivot, depressing the rearwardly extending arm thereof as shown in Fig. 7 and leaving the upwardly projecting extension 21 of the adjacent gear shifting arm exposed and subject to engagement by the pawl 26 associated therewith when the clutch pedal is forwardly operated. It will be evident that with the rear portion of a lever 34 depressed, the pawl 26 will not be carried by the inclined section thereof above the adjacent gear shifting arm and that with the continued forward movement of the clutch pedal the pawl 26 will strike against the projection 21 and force such arm forward. If arm 14 is the one carried forward, arm 13 and its rod 6 will be forced to the rear shifting one gear into transmitting position. If it is arm 15, then arm 13 will be operated forwardly also carrying rod 6 therewith and shifting another gear into transmitting position. The arm 11 may also be operated rearwardly or forwardly depending upon which of the arms 16 or 17 is actuated. In any case with the depression of a button followed by forward movement of the clutch pedal to its extreme forward position a gear will be shifted into transmitting position. The remaining pawls will also be carried forward but will ride over the projections 21 of their gear shifting arms due to the inclined upper edges of the levers 34 which have not been operated and will clear such projections without in any manner acting on their gear shifting arms. The gear shifting arm coupled with the one carried forward will, however, be carried to the rear a distance equal to the forward movement of forwardly operated arm through the link and lever connection at 19 and 20. With the return of the clutch pedal to normal position, the pawl 26 will ride backwardly over the projection 21 of the rearmost gear shifting arm, spring 30 yielding for this operation, and the pawl will stop a distance back of said projection when the clutch is reëngaged.

It will be noted that with the forward movement of an engaged gear shifting arm, its pin 22 is carried forward over the rearwardly extending arm of its lever 34 which has been depressed, permitting such movement, and that when the gear shifting arm has been carried to its extreme forward position, its pin 22 rests against the upper edge of the rear arm of its associated lever 34 holding it in depressed position and acting to keep the spring 38 compressed, and the forward end of the selecting lever 46 associated therewith depressed, in this manner operating as an effective indicating means to tell which speed is being secured at any time. This will be the case as long as the gear corresponding to such speed is in transmitting position. Any other of the levers 46 may thereafter be depressed but if not followed by forward operation of the clutch pedal, will not remain depressed after being released. This provides a simple and very effective indicator of the speed in which an automobile gearing is working and one that at all times actually indicates the gear actually in transmitting position.

When a gear is in transmitting position, the same operation is gone through with to change to another desired gear. The button corresponding thereto is operated and the clutch pedal moved forward. The lever 34 corresponding to the depressed button has its rear end depressed as before and the projection 21 of the adjacent gear shifting arm exposed for engagement by its associated pawl 26. Before such engagement can take place, however, the gear shifting arm which is in rearmost position will have been carried forward through engagement by its pawl 26, and the arm coupled therewith carried backward until both arms are in neutral position, the pin 22 of the forwardly positioned arm riding down the incline of its lever 34 until it comes to the end thereof and then permitting the end of the lever to snap upwardly into place, while as the rearmost gear shifting arm is carried forward, the pawl 26 actuating it gradually elevates by reason of its movement along the inclined upper edge of its lever 34 which such gear shifting arm is approaching until, when the arm is at its central neutral position and its pin 22 strikes against the end of the adjacent lever 24, the pawl 26 has been elevated just above the upper point of the arm, thereby leaving it in central neutral position. It is as this neutral position of the gear shifting arms is reached that a pawl 26 engages the exposed projection 21 of the arm selected to be carried forward and on further forward movement of the clutch pedal will carry said arm forward accomplishing the shift of gearing selected. It will also be noted that the pawls 26 in all instances, when in rearmost position, are a distance back of the projection 21 of any arm even when it has been retracted to its rearmost position as shown by arm 14 in Fig. 7, and that the first or initial movement of the clutch pedal serves to disconnect the clutch before any operation of the gear shifting mechanism takes place. I have indicated by dotted lines $w$, $x$, $y$, and $z$, the relative positions of the center line passing through the clutch pedal and the shaft on which it is mounted at various portions of the operation of the gear shift. Line $w$ indicates the pedal with the clutch engaged. Line $x$ indicates the clutch as disengaged and the position at which neutralizing of any gear already in transmitting position begins. Line $y$ is the position when the neutralizing has been accomplished and at which the new shifting of gearing begins. And line $z$ indicates the foremost position of the clutch pedal and at which the shift has been accomplished. All of the operations follow on forward movement of the pedal and by application of force delivered positively to the clutch pedal. If after a gear is in transmitting position, the clutch is merely to be disengaged, it may be moved only from line $w$ to line $x$ and no alteration of the gearing will occur. It will be easy to tell how far forward to move the clutch pedal for disengagement of the clutch only, as the striking of a pawl 26 against the projection 21 of the rearmost arm will warn the operator against further forward movement unless he desires neutralizing of the gearing which will take place if the pedal is forced farther forward. If at any time neutralizing of the gearing is desired without shifting of another gear into transmitting position, it may be secured by merely forcing the clutch pedal forward without operating the selective mechanism at all, no gear thereafter being carried into place.

From the foregoing it will be apparent that I have made a very practical and efficient shifting mechanism for selective speed gearing and one easily manufactured and assembled without undue cost. Various modifications may be made in this structure, and I do not limit myself to the precise construction shown and described, but consider myself entitled to all modifications falling within the scope of the appended claims defining the invention.

What I claim as new and desire to secure by Letters Patent is:

1. A mechanism adapted for sliding gear transmissions including slidably shifting rods, a series of shifting elements operatively connected in pairs and to the shifting rods one pair for each rod and each shifting element having an upwardly extending projection, means whereby said shifting elements are pivotally mounted, actuating means including a series of dogs movably mounted adjacent said shifting elements with a dog adapted to associate with each shifting element, means for actuating said actuating means, means normally carrying the dog over said projection, and selective means manually operable for removing said carrying means from normal position with respect to any of the shifting elements and thereby exposing its projections for engagement by its associated dog on actuation of the actuating means.

2. A mechanism adapted for sliding gear transmissions including movable shifting rods, shifting elements each having a projection formed thereon operatively connected to said shifting rods, means whereby said shifting elements are movably mounted and whereby on movement thereof the shifting rods will be moved, actuating means for moving the shifting elements, said actuating means including a series of engaging elements one for each shifting element, means for operating said actuating means into position for engagement of the engaging elements with said projections, means normally carrying said engaging elements over the said projections, and means for selectively removing the said carrying means from normal position with relation with any desired shifting element and thereby exposing its projection for engagement by an engaging element on operation of the actuating means.

3. A mechanism adapted for sliding gear transmissions including a pair of slidable shifting rods, arms pivotally connected thereto, a shaft to which one arm is secured, and a sleeve loosely positioned on the shaft and to which the other arm is secured, a shifting element secured to the sleeve and a second shifting element secured to the shaft, other shifting elements loosely mounted on the shaft, means connecting the element secured to the sleeve to one of the loosely mounted shifting elements whereby on movement of either of the shifting elements the other shifting element will move equally and in the opposite direction, similar connecting means between the element secured to the shaft and the remaining loosely mounted element, an actuating means including a series of engaging elements one for each shifting element, means to move said actuating means with respect to the shifting elements, means formed on each shifting element and lying in the path of the said engaging elements for engagement thereby, means normally preventing said engagement, and means to render said preventing means ineffective and permit the engagement of any engaging element with said means on any selected shifting element to thereby operate it and move one of the shifting rods on operation of the actuating means.

4. A mechanism adapted for sliding gear transmissions including movable shifting rods, shifting elements operatively connected to said shifting rods and movably mounted, actuating means adapted to move said shifting elements, said actuating means including a series of engaging elements one for each shifting element, means whereby said actuating means may be operated, means formed on each shifting element and lying in the path of the said engaging elements for engagement thereby, means normally preventing said engagement, and means to selectively render said preventing means ineffective and thereby permit the engagement of any engaging element with said means on any selected shifting element as the actuating means is operated.

5. A mechanism adapted for sliding gear transmissions including slidable shifting rods, a series of shifting elements operatively connected in pairs and to the shifting rods one pair for each rod, means whereby said shifting elements are movably mounted and whereby on movement thereof the shifting rods will be moved to shift gears in the transmission gearing, actuating means adapted to move said shifting elements, said actuating means including a series of dogs one for each shifting element, means for operating said actuating means including a lever and connections between the lever and actuating means, devices formed on each shifting element and lying in the path of the said dogs for engagement thereby, means normally preventing such engagement, and means adapted to be selectively operated to render the engagement preventing means ineffective and permit the engagement of any dog with said means on any one of the shifting elements as the actuating means is operated.

6. A mechanism adapted for a sliding gear transmission including slidable shifting rods, a series of shifting elements each having a projection formed at the front upper corner thereof and operatively connected in pairs to the shifting rods one pair for each rod, means whereby said shifting elements are pivotally mounted above an axis of rotation, a pin projecting laterally from the rear upper corner of each shifting element, a series of levers, one for each shifting element pivotally mounted in front thereof and having rearwardly extending arms adapted to engage with the said pins when the shifting elements are in upright position, said arms also having inclined upper edges reaching from adjacent the said pins to the uppermost points of the said projections on the shifting elements, means to individually operate said levers to lower the rearwardly extending arms thereof, an actuating means pivotally mounted and including a series of dogs movably mounted one for each shifting element and normally positioned back of the said shifting elements, said dogs adapted to ride upon the inclined upper edges of the said levers when the levers are in normal position and to engage against the projections of the shifting elements when the levers are operated away from normal position, and means for operating the actuating means forward.

7. A mechanism adapted for a sliding gear transmission including a slidable shifting rod, an actuating means including a movably mounted engaging device, a shifting element movably mounted and connected with the shifting rod, said shifting element having a projection at the front upper corner thereof lying in the path of the said engaging device, a lever pivotally mounted in front of the shifting device and having an arm extending backward along side thereof, said lever having an inclined upper edge leading from the uppermost point of the said projection downwardly and rearwardly below the rear portion of the upper edge of the shifting element whereby the engaging device may be carried over the said projection, means to lower the said arm of the lever to permit the engaging device to engage against the said projection, and means for moving the actuating means and engaging device forward.

8. A mechanism adapted for a transmission gearing including a pair of slidable shifting rods, two shifting elements, direct connections between each of said shifting elements and a shifting rod whereby pivotal movement of the shifting element will operate the shifting rod connected thereto, means for pivotally mounting said shifting elements, two additional shifting elements pivotally mounted adjacent each of the first shifting elements to thereby form two pairs of shifting elements, an upright link pivotally mounted at its middle a distance from each of said pairs of shifting elements, and links pivoted to the ends of each of said upright links and having pivotal connection with the two pairs of shifting elements, substantially as described.

9. A mechanism adapted for a transmission gearing including movable shifting rods, shifting elements operatively connected to said shifting rods and pivotally mounted, actuating means pivotally mounted and adapted to move said shifting elements, said actuating means including a series of engaging devices one for each shifting element, a projection formed at the front upper corner of each shifting element, a pin projecting laterally from the rear upper corner of each shifting element, a series of bell-crank levers, one for each shifting element, pivotally mounted in front thereof and having rearwardly and downwardly extending arms, the rearwardly extending arms lying adjacent the shifting elements and normally having engagement with the pins when the shifting elements are in upright position, said arms also having inclined upper edges reaching from adjacent the pins to the uppermost points of said projections on the shifting elements, wires operatively attached to the downwardly extending arms of the bell-crank levers, indicating levers pivotally mounted and operatively connected to said wires whereby depression of an indicating lever will cause the operation of a bell-crank lever to lower its rearwardly extending arm thereby lowering said arm below the projection of the adjacent shifting element, a lever, connections joining the actuating means and lever whereby forward movement of the lever will draw the actuating means forward and cause the engagement of an engaging device thereof with any projection above said rearwardly extending arms of the bell-crank levers and will force the shifting element of said projection forward carrying the pin thereof over the said rearwardly extending arm of its adjacent bell-crank lever, thereby holding the indicating lever associated therewith depressed until said bell-crank lever is freed.

In testimony whereof, I have hereunto affixed my signature in the presence of two witnesses.

BAYARD E. RICHARDSON.

Witnesses:
  A. M. LYNN,
  FRANK E. LIVERANCE, Jr.